Patented July 26, 1938

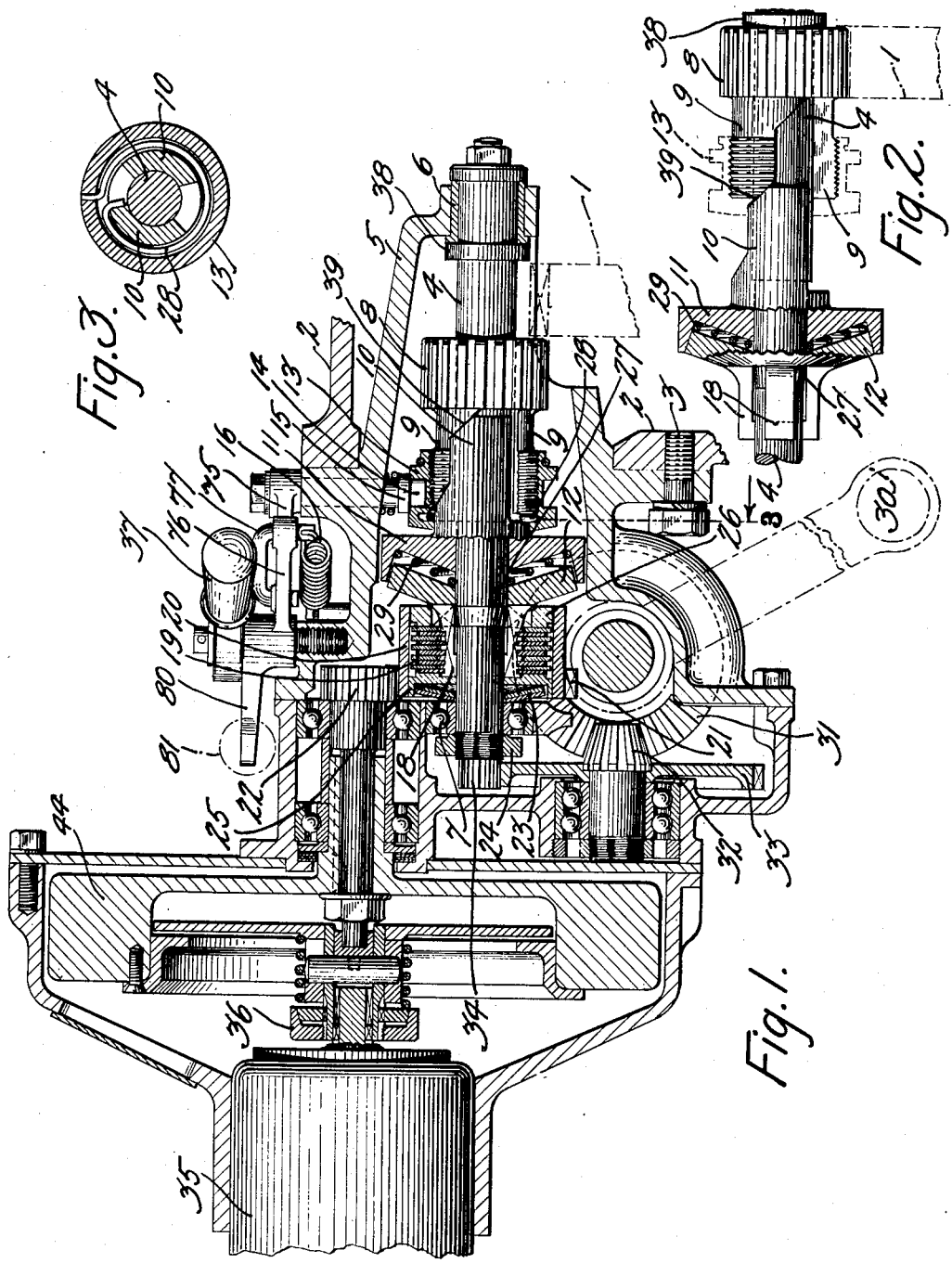

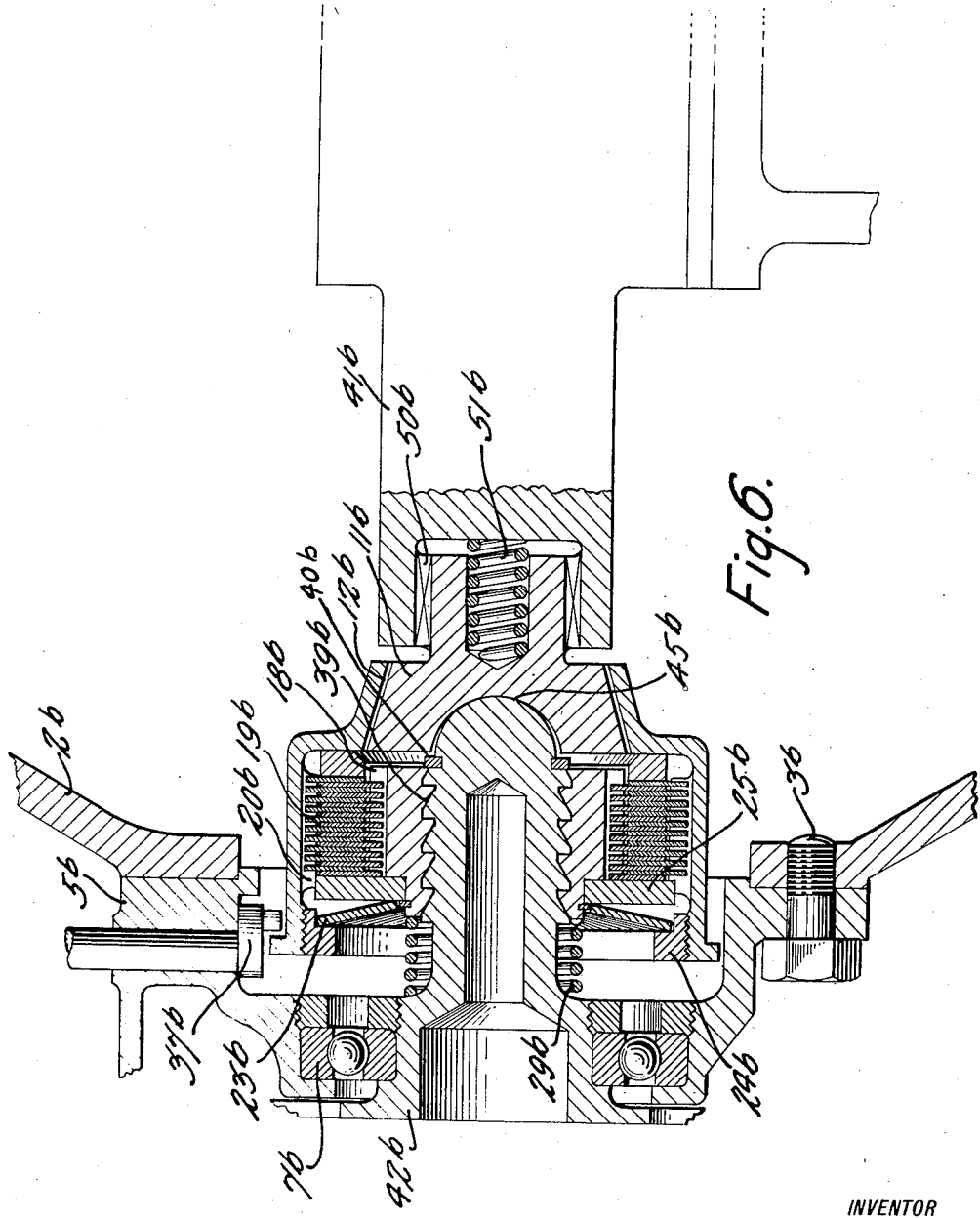

2,124,812

UNITED STATES PATENT OFFICE 2,124,812

ENGINE STARTER

Roland Chilton, Keyport, N. J., assignor, by mesne assignments, to Eclipse Machine Company, Elmira Heights, N. Y., a corporation of New York Application November 1, 1927, Serial No. 230,341

31 Claims. (Cl. 123—179)

This invention relates to starters, and more specifically, to the type of starter wherein a flywheel is energized to a high speed of rotation and then engaged with the means to be started through a gear train and yielding clutch connection. Such load limiting clutches are subject to relatively high loads requiring substantial wearing surface and high friction producing pressure which is usually applied by relatively heavy spring means. Extreme free running in the disconnected or energizing period is essential, but is difficult to achieve where the clutch is disengaged against the pressure of the necessarily heavy springs which necessitate correspondingly heavy control means subject to heavy axial thrust.

It is also desirable that the clutch should maintain a constant slipping load in service, any excess frictional effects being liable to over-strain the gears, while premature slipping may cause failure to start. Clutches which are engaged and disengaged as by manual control are more apt to vary than those having a preset spring maintaining the parts in permanent contact and the combination of the latter form of clutch with a separate positive engine engaging means is featured in my Patent #1,561,506 according to which a large number of successful type inertia starters have gone into use. The positive engine engaging jaw in such starters is on the low speed shaft where inertia effects are small. Most automotive starters, on the other hand, include a pinion meshing with a large gear, often in the form of a ring around the flywheel, and the engagement is then at a relatively high speed shaft, which might cause serious clashing if it were attempted to engage the pinion at full speed.

An object of the present invention accordingly, is to provide a means whereby the starter mechanism may be brought up to full speed, whilst the pinion or other engine engaging member is stationary, and the pinion then engaged at zero, or at creeping velocities with the engine and subsequently connected with the preset clutch by means adapted for shockless engagement at high speed.

This means is one of the features of this invention, and comprises a normally disengaged friction clutch having a torque responsive non-slipping engagement when contact has been initiated and the combination of such a clutch with a preset slippable clutch is a further feature of the present invention. A still further feature of the preferred showing of Fig. 1 consists in the utilization of the axial reactions from the torque responsive means to oppose the preset spring pressure of the slipping clutch so as to render the slipping point substantially independent of variations in the co-efficient of friction which are likely to occur due to changes in lubrication and other conditions in service.

Various other objects and advantages of the invention will be in part obvious from an inspection of the drawings and a careful consideration of the following particular description and claims of several forms of mechanism embodying my invention.

In the drawings:

Figure 1 is a longitudinal section of the preferred form of the present invention.

Figure 2 is a fragmentary detail of the pinion shifting mechanism.

Figure 3 is a cross section on the line 3 of Fig. 1 looking in the direction indicated by the arrow.

Figure 4:
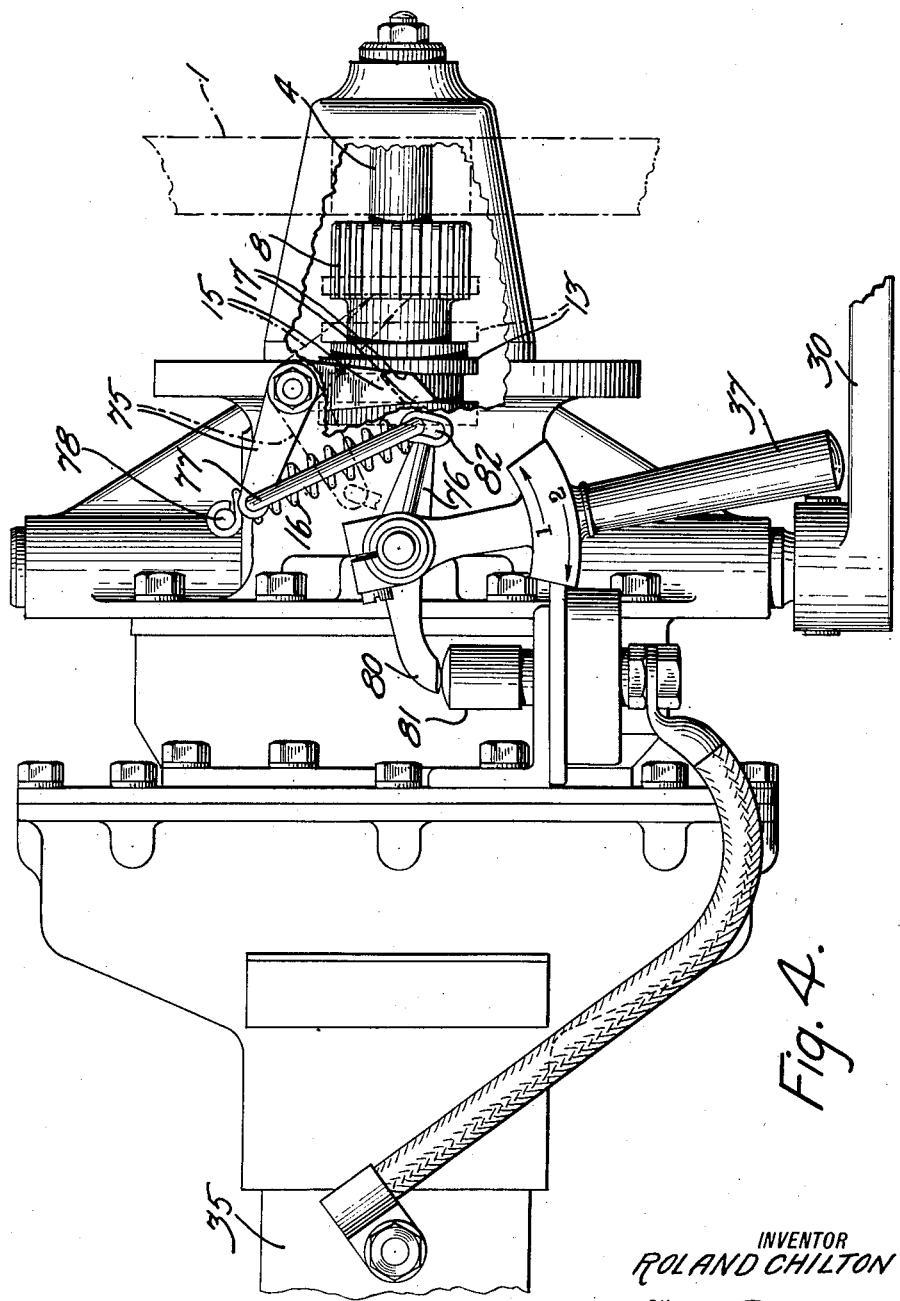
Figure 4 is a top plan of the parts shown in Fig. 1 with a portion of the casing broken away so as to disclose the interior.

With reference to Figs. 1 to 4, 1 designates the flywheel gear of an engine to be started and 2 the flywheel housing to which the starter is secured as by bolts 3. The pinion shaft 4 is supported in the starter housing 5 by an outboard bearing 6 and an inner bearing 7 which is preferably of the anti-friction type. Mounted freely on this shaft is a shiftable pinion 8 having the cam-ended projections 9 which engage for axial movement and slight subsequent relative rotation, the corresponding fingers 10 formed on the clutch member 11, said clutch member being also free to rotate on the shaft 4 and having slight axial freedom thereon for engagement with the companion clutch member 12. Secured as by screw-threads, on the fingers 9 of the pinion 8 is a control collar 13 which is engaged by the end projection 14 of the control lever 15. This control lever normally holds the pinion in the demeshed position by means of the spring 16, the demeshing movement being limited by contact of the flat sides 17 (Fig. 4) of the lever end within the groove of the control collar which generates a frictional braking effect thus holding the pinion from rotation while the shaft 4 rotates within it when the starter flywheel 44 is being brought up to speed.

The lever 15 is rigidly connected to the external lever 75 which is in turn coupled to the arm 76, rigid with the operating handle 37, by the link 77. The demeshing spring 16 is extended between the anchor pin 78 and the end of the link 77 and normally maintains the mechanism in the disengaged position shown. The angular relation of the lever 75, the arm 76, and the spring 16 affords a toggle action, whereby the spring resistance to the operating movement decreases as the meshing position is approached, so that it will be natural for the operator to keep the handle in fully meshed position until he deliberately releases it upon the starting of the engine.

The driving clutch member 12 is provided with projections 18 comprising splines engaging alternate friction plates of a clutch 19, the intermediate plates of which are splined to outer clutch member 20 which carries the gear 21 meshed with the starter flywheel pinion 22. A dished spring 23, adjustable by the nut 24, constitutes a preset pressure means that acts on the clutch plates, through the pressure plate 25, against the abutment plate 26 which has internal projections extending between the fingers 18 and engaging a conical abutment 27 formed on the shaft 4 by which the plate 26 is restrained from axial motion.

Within the control collar 13 is a torsion spring 28, shown in detail in Fig. 3, said spring having an end bent so as to be slidable along one of the fingers 10 which it tends to rotate relative to the engaged finger 9 into the position shown in Fig. 2. The clutch members 11 and 12 are normally held out of contact by a light spring 29.

The starter flywheel 44 may be energized either through a hand crank 30, and suitable multiplying gear train 31, 32 and 33, the latter gear engaging the pinion 34 on the pinion shaft 4, or the flywheel may be energized by the electric motor 35 through a suitable coupling 36, the particular form shown in the drawings constituting the subject of a separate application. The operation of the device is as follows:—

With the parts in the position shown in Fig. 1, the starter flywheel is energized to high speed by any suitable means such as just described and then the operating handle 37 is actuated towards the left. Initial movement relieves the frictional pressure of the faces 17 of the lever projection 14 in the groove of the collar 13 of the pinion which is then free to creep around under the influence of the shaft 4 which is rotating at high speed within the pinion. The resulting slow rotation of the pinion permits easy engagement of the teeth and the pinion is moved towards the abutment 38 of the shaft 4. When the cam faces 39 at the end of the fingers 9 and 10 (which up to this point act as a spline connection for the longitudinal movement of the pinion) are reached, the torsion spring 28 completes the movement, producing torque responsive end reactions due to the cam faces 39 which overcome the light spring 29, bringing the then stationary clutch member 11 into contact with the rotating clutch member 12 whereupon the driving connection is completed in a self-locking manner, due to the torque responsive end reactions of the cam faces 39. These reactions are resisted, in one direction by the abutment, and in the other direction by the pressure plate 25 abutted by the end of the projections 18 and hence the reactions oppose the preset clutch spring 23 and tend to disengage this clutch when the driving load or torque to which these reactions are proportional, reaches the preset figure, whereupon the clutch plates 19 will slip until the engine to be started has been brought up to speed.

When electrical operation of the starter flywheel is desired instead of manual, the operating handle 37 which is provided with an arm 80 adapted to engage and close a switch 81, is moved in the direction indicated by the arrow 1, (Fig. 4), a slot 82 being provided in the arm 76 to permit the free movement of the handle in this direction. When the starter flywheel has become sufficiently energized, the handle is moved in the opposite direction (as indicated by the arrow 2) to cause a meshing of the pinion 8.

When the engine starts, the control handle 37 is released, and the spring 16 returns the parts to disengaged position.

It will be seen that the torque responsively engaged clutch members 11 and 12 constitute a one-way driving connection, since no friction pressures are generated when the engine over-runs the starter which over-run will separate the cam faces 39 but will produce no demeshing tendency. Such over-run occurs whenever the engine, in running over a compression, accelerates to a greater speed than that due to the starter, which action would cause the violent demeshing and remeshing known as "hunting" but for the one-way action of the torque responsive clutch which is one of the features of this invention.

It will be seen that when the preset clutch slips upon engagement of the pinion 8 with the stationary engine, the only moving parts, in this preferred structure, are the outer clutch members 20, the plates 19 attached thereto, the flywheel and its pinion; and that the only parts in sliding contact subject to clutch spring pressure are the clutch plates themselves, and thus extraneous friction and wear, as from clutch thrust bearings apt to effect the calibration of the clutch are avoided.

This invention is not limited to the preferred form of torque responsive clutch and load limiting clutch co-acting for the control of the latter as described in the foregoing, and other forms of self-locking and load limiting clutches may be used without departing from the spirit of this invention. As an example, a starter embodying certain features of this invention but using a self-locking coil clutch as the torque responsive means in combination with a preset cone clutch in place of the cam operated cone clutch and the multiple plate preset clutch of the preferred showing may be used.

Figure 5:
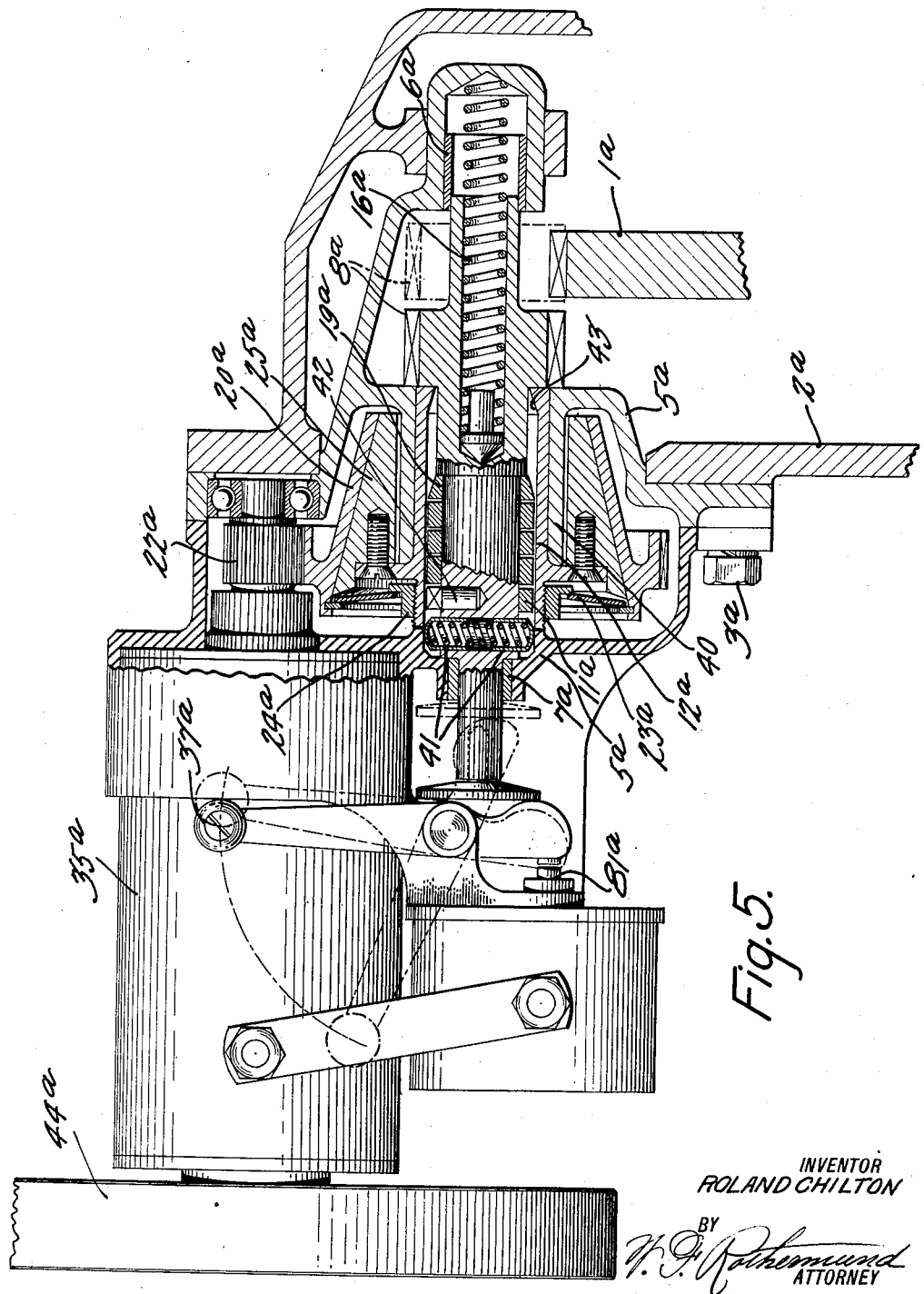
Figure 5 is a longitudinal section of a further alternative structure.

Referring to Fig. 5, wherein parts corresponding to those in the structures already described are designated by similar numerals with the addition of the exponent "b", it will be seen that 2b represents the engine housing to which the starter housing 5b is secured by bolts 3b. The starter shaft 42b carries the torque responsive means which in this case comprises a screw threaded portion 39b engaging the inner clutch member 18b to which are splined alternate plates of the clutch assemblage 19b, the intermediate plates being splined to the external clutch member 20b which is provided with a conically bored extension 12b which is normally kept out of engagement with the driven clutch member 11b by the spring 29b. It will be seen that the parts 18b, 19b, 20b, 23b, 24b and 25b form an external clutch assemblage which is held together by the nut 24b, movable as a unit upon the screw threads 39b, and normally maintained against a stop 40b by the spring 29b so as to provide a clearance between the part 11b and the conical bored extension 12b. The plate clutch is preset by the spring 23b and adjusting nut 24b. The driven clutch member 11b is permanently engaged with the crank shaft 41b by means of the splines 50b, and for convenience in assembly, end play at the abutment 45 is taken up by the spring 51b. The action of this embodiment is as follows:—

The starter shaft 42b is brought up to speed with the members 11b and 12b of the self-locking clutch held out of contact by the spring 29b. When sufficient seed has been obtained, the control lever 37b is operated, moving the external clutch assemblage against the action of the spring 29b so that the rotating member 12b engages the stationary cone 11b to which it is instantly locked by the reactions from the screw threads, effective through the spherical abutment 45a, between the starter shaft and the driven clutch cone. This reaction is balanced by an equal pressure of the threaded clutch member 18b against the pressure plate 25b and the clutch spring 23b which reaction overcomes the clutch spring when the present torque is reached, thus rendering the slipping point of the clutch independent of variations in the co-efficient of friction.

It will be seen that in all three of the embodiments shown very slight control pressures are adequate, it being merely necessary to initiate the contact of the torque responsively locked clutch, while the preset clutch is free of manipulation which might upset its adjustment and would require heavy control means.

It should be understood that where a pinion has been shown and described in the foregoing specification and in the drawings as the element which engages the engine for starting, it is not intended that the same shall be restricted solely to the form shown and described, but that any suitable form of engine engaging means may be employed in place thereof.

Variations may be resorted to within the scope of the invention and portions of the improvements may be used without the others, whilst not departing from the spirit of the invention.

Having thus described my invention, I claim:

1. In apparatus of the class described, a drive mechanism which includes a duplex clutch comprising in combination, a preset pressure means, members frictionally engaged by said pressure means for slippage at a predetermined load, a member frictionally contactable with one of said frictionally engaged members when rotating at full speed, control means for initiating said contact, and means responsive to the driving torque to thereupon impose pressure at said contact but not upon said control.

2. An engine starter drive apparatus comprising in combination, an intermediate member, a driving member frictionally preengaged therewith for slippage at a preset load, a driven member engageable with the intermediate member, torque responsive pressure means adapted to prevent slippage at the last said engagement, and control means independent of said pressure means to initiate said engagement and to permit the severance thereof.

3. In an engine starter, the combination of a power member, a pinion, a preset slippage clutch, a second friction clutch disengaged while the starter is being brought up to speed, both of said clutches being in drivable relation with the pinion, means to mesh the pinion with an engine to be started, and torque responsive means brought into action only in the event that the pinion has first been meshed, said torque responsive means acting to engage the second said clutch.

4. In a starter, the combination with an engine having a starting gear, of a pinion, a power means rotatable to full speed independently of and within said pinion, means independent of said power means to mesh the pinion with the engine gear, and clutch means adapted to drivably connect the pinion to the power means.

5. In a starter having a power member and a pinion adapted to be meshed with a gear of an engine to be started, the combination of means for effecting such meshing action between said pinion and gear comprising a member cooperating with the pinion and adapted to produce a reaction from the driving load, and a pair of clutches drivably disposed between the power member and the pinion and adapted respectively for engagement and disengagement by said reaction produced by said means.

6. In a starter having a power member and a pinion adapted to be meshed with a gear of an engine to be started, the combination of means adapted to effect such mesh, torque responsive means adapted to thereupon impose an axial reaction from the driving load enforcing such mesh whilst the engine is driven by the power member, and a pair of pinion driving clutches subject to said reaction so as to tend to engage one of said clutches and to disengage the other.

7. In apparatus of the class described, the combination in drivable relationship with a member of an engine to be started, of a mesh pinion normally demeshed from the engine member, a pinion driving means free for rotation within the pinion whilst the pinion is at rest, a preset slippable clutch, and a second clutch torque responsively engaged against slippage when the pinion is meshed.

8. In a starter, the combination with a member to be rotated of a preset friction clutch, a pinion, a normally disengaged clutch having a drivable connection with the pinion, means to move the pinion into mesh with the member to be rotated, means for delaying such meshing movement until performance of a manual operation which need not occur until after acceleration of said preset friction clutch, and torque responsive means brought into action only in the event that the pinion has first been meshed to thereupon lock the second said clutch against slippage.

9. In a starter, the combination with a member to be rotated of a preset friction clutch, a pinion, a normally disengaged clutch drivably associated with the pinion, means to move the pinion into mesh with said member, means for relaying such meshing movement until performance of a manual operation which need not occur until after acceleration of said preset friction clutch, and torque responsive means brought into action only in the event that the pinion has first been meshed to thereupon lock the last said clutch against slippage whilst the starter tends to drive the engine.

10. In a starter having a power means, the combination of a pinion adapted for movement into mesh with a member to be rotated, means for delaying such meshing movement until performance of a manual operation which need not occur until after acceleration of said power means, a normally disengaged clutch engageable to drive the pinion from the power means, torque responsive means brought into action only in the event that the pinion has first been meshed to thereupon enforce said engagement in one direction of power application only, and a second friction clutch preset to slip under abnormal loads.

11. In a starter, the combination of a pinion meshable with an engine member to be rotated, a control collar for said pinion, a pinion control lever engaged with the collar, a spring adapted to normally maintain the parts in demeshed relation, and means associated with said lever for imposing frictional restraint sufficient to prevent rotation of the pinion.

12. In a starter having a pinion meshable with a member of an engine to be rotated, the combination of a control means adapted to effect the meshing of said pinion, a spring adapted to normally maintain the parts in disengaged position, and means having a toggle action whereby the resistance the spring offers to the control movement is greater in the demeshed position than in the meshed position.

13. In a starter, the combination of a driving means, a pinion connected to said driving means for meshing action with a member of an engine to be started, cooperating cam-surfaced elements on said driving means and pinion, and means acting through said cam-surfaced elements to enable the pinion to overrun the driving means and still remain in mesh with said engine member.

14. In an engine starting mechanism of the type embodying a driving member and an engine member, the combination with said members of an elongated recessed member normally disengaged from said engine member but movable into driving engagement therewith, resilient means operatively connected to said recessed member to exert a turning tendency thereupon and thereby oppose movement thereof into engine engaging position, and means for effecting such engine engaging movement notwithstanding said resilient means.

15. A starting mechanism employing in combination with a member of the engine to be started, a driving shaft extending coaxially within the end portion of said engine member, said driving shaft being provided with projecting driving surfaces adapted to remain in driving relation with the corresponding surfaces on said engine member, means for rotating said driving shaft, a normally disengaged clutch interposed between said rotating means and said driving shaft and manually operable means for causing said clutch to drivably engage said rotating means and driving shaft.

16. A starting mechanism employing in combination with a member of the engine to be started, a driving shaft extending coaxially within the end portion of said engine member, said driving shaft being provided with projecting driving surfaces adapted to remain in driving relation to the corresponding surfaces on said engine member, means for rotating said driving shaft, a normally disengaged clutch interposed between said rotating means and said driving shaft and manually operable means for causing said clutch to drivably engage said rotating means and driving shaft, and resilient means for disengaging said clutch by the release of said manually operable means.

17. A starting mechanism comprising in combination with a driving member for a driven member, a friction disc clutch and a second normally disengaged clutch interposed between said driving and driven members, said second named clutch including an outer member having a hollow tapering internal surface and an inner member having an external surface of corresponding taper, resilient means normally acting upon said outer member to hold it out of engagement with said inner member, and manually operable means engageable with said outer member to move it into driving engagement with said inner member against the force of said resilient means.

18. In starting apparatus of the class described, a driven member movable into engagement with a member drivably connected with the crankshaft of an engine to be started, a driving member therefor, multiple disc clutch means drivably connecting said driving and driven members, a prime mover for rotating said driving member, a cone clutch drivably connected to said driven member and normally disconnected from said prime mover, means for rotating said prime mover, manually operable means for causing engagement between the driven member and the engine member at relatively low speed, and means reacting through said driven member to move said cone clutch into driving relation with said driven member.

19. In combination, a driving member, a driven member adapted to engage and crank an engine member drivably connected with the crankshaft of an engine to be started, means including a pair of normally disengaged friction clutch elements for drivably connecting the driving and driven member, means for moving said driven member into engagement with the engine member, means operable in response to operation of said last named means to react upon said friction clutch to cause the latter to establish driving connection between said driving member and said driven member, and means interposed between said pair of clutch elements constantly resisting the establishment of said driving connection.

20. In a starter having a power means, the combination of a meshing pinion, a drive shaft adapted to rotate at high speeds freely therein, manually operable means to mesh said pinion with an engine to be started, means operable in response to operation of said last named means to drivably connect the pinion with the drive shaft, and means movable by and with said manually operable means to control energization of said power means.

21. In a starter having a power means, the combination of a meshing pinion, a drive shaft adapted to rotate at high speeds freely therein, manually operable means to mesh said pinion with an engine to be started, means operable in response to operation of said last named means to thereupon drivably connect the pinion with the drive shaft, and means separate from said pinion and drive shaft for demeshing said pinion, said last named means being ineffective until release of said manually operable means, even though the engine has in the meantime started under its own power.

22. An engine starting mechanism comprising an engine member and a driving member, friction means for normally holding said driving member out of engagement with said engine member, manually operable means for moving said driving member into engagement with said engine member, and means responsive to such engagement to form a yielding torque limiting connection between said starter and engine member.

23. An engine starting mechanism comprising an engine member, a driving member engageable therewith, friction means for normally holding said driving member out of engagement with said engine member, manually operable means for moving said driving member into engagement with said engine member, and means for disconnecting said driving member from said engine member upon release of said manually operable means.

24. An engine starting mechanism comprising an engine member, a driving member engageable therewith, friction means for normally holding said driving member out of engagement with said engine member, manually operable means for moving said driving member into engagement with said engine member, and means for disconnecting said driving member from said engine member upon release of said manually operable means, said disconnecting means being adapted to be compressed axially upon movement of the driving member into engagement with the engine member.

25. An engine starting mechanism comprising a driving member, a driven member adapted to drivably connect said driving member with a member of the engine to be started, friction means normally holding said driven member out of engagement with said engine member, manually operable means for moving said driven member into engagement with said engine member, and means for disconnecting said driven member from said engine member upon release of said manually operable means.

26. An engine starting mechanism comprising a driving member, a driven member adapted to drivably connect said driving member with a member of the engine to be started, friction means for normally holding said driven member out of engagement with said engine member, manually operable means for moving said driven member into engagement with said engine member, and means for disconnecting said driven member from said engine member upon release of said manually operable means, said disconnecting means being adapted to be compressed axially upon movement of the driven member into engagement with the engine member.

27. In a starter having a driving member at one end thereof and an engine engaging member at the other, a normally disengaged clutch interposed between said members, means independent of said driving member for moving said engine engaging member into engine engaging position, and means integral with said engine engaging member for engaging said clutch only after said meshing means has been operated.

28. In a starter, the combination of an engine engaging member having a plurality of engine engaging teeth and also an integral cam-surfaced portion to the rear of said engine engaging teeth, a driving element having a cam-surfaced portion registrable with said first-named cam-surfaced portion to transmit torque therethrough when the engine engaging member is in engine engaging position, and means enabling said engine engaging member to run ahead of said driving element and thereby remain in engine engaging position even when the engine accelerates to a speed greater than that of said driving element, said last-named means including a one-way friction clutch having a spring mounted therein to cause said clutch to slip in response to such engine acceleration.

29. In a starter, the combination of an engine engaging member having a plurality of engine engaging teeth and also an integral cam-surfaced portion to the rear of said engine engaging teeth, a driving element having a cam-surfaced portion registrable with said first-named cam-surfaced portion to transmit torque therethrough when the engine engaging member is in engine engaging position, and meshing means for moving said engine engaging member into engine engaging position independently of any movement of said driving element.

30. In a starter, the combination of an engine engaging member having a plurality of engine engaging teeth and also an integral cam-surfaced portion to the rear of said engine engaging teeth, a driving element having a cam-surfaced portion registrable with said first-named cam-surfaced portion to transmit torque therethrough when the engine engaging member is in engine engaging position, meshing means for moving said engine engaging member into engine engaging position independently of any movement of said driving element, and resilient means for withdrawing said engine engaging member, said last named means being ineffective until release of said meshing means.

31. A starting device for internal combustion engines comprising a starting motor and an inertia mass driven by said starting motor, a displaceable element engageable with the engine for starting, a disengageable clutch for connecting said displaceable element with said inertia mass, a switch controlling energization of the motor, and a single operating instrumentality for both the switch and displaceable element, said single operating instrumentality including a switch operating lever and means responsive to movement of said lever to exert an axially directed thrust first upon said displacement element, and subsequently upon said clutch.

ROLAND CHILTON.